United States Patent [19]

Meegan

[11] 4,419,781
[45] Dec. 13, 1983

[54] DIPSTICK WIPER APPARATUS

[76] Inventor: Dennis J. Meegan, 4 Meadowbrook Dr., Auburn, N.Y. 13021

[21] Appl. No.: 370,717

[22] Filed: Apr. 22, 1982

[51] Int. Cl.³ .............................................. G01F 15/12
[52] U.S. Cl. ................................ 15/210 B; 15/244 R
[58] Field of Search ............ 15/210 B, 210 A, 104.92, 15/227, 244 R

[56] References Cited

U.S. PATENT DOCUMENTS

| | | | |
|---|---|---|---|
| 2,259,898 | 10/1941 | Lescher | 15/210 B |
| 2,575,361 | 11/1951 | Reip | 15/210 B |
| 2,810,923 | 10/1957 | Desso | 15/210 B |
| 4,207,645 | 6/1980 | Suckling | 15/210 B |
| 4,245,367 | 1/1981 | Stoute | 15/210 B |

FOREIGN PATENT DOCUMENTS

| | | | |
|---|---|---|---|
| 532889 | 11/1956 | Canada | 15/210 B |
| 710077 | 6/1954 | United Kingdom | 15/210 B |

Primary Examiner—Chris K. Moore
Attorney, Agent, or Firm—Martin LuKacher

[57] ABSTRACT

To permit engine oil levels to be checked accurately and cleanly without the need for a rag or other such wiper, a housing adapted to be attached to the dipstick tube, or other engine or engine compartment part, contains a body of wiping material having a slot therein through which the dipstick may be inserted and removed clean of oil so as to be ready to be inserted into the dipstick tube again to check the engine oil level.

7 Claims, 6 Drawing Figures

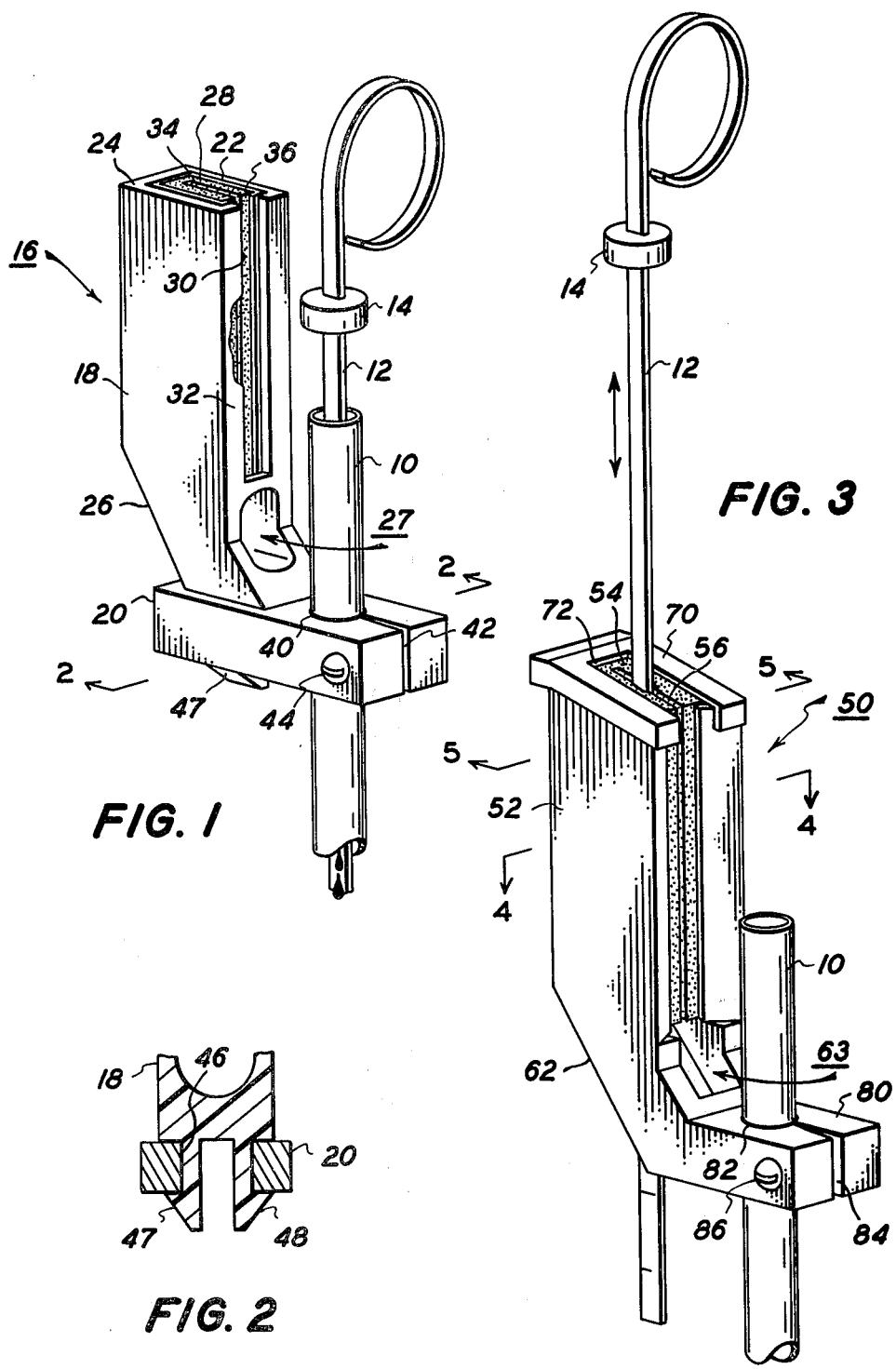

DIPSTICK WIPER APPARATUS

DESCRIPTION

The present invention relates to apparatus for wiping oil from a dipstick so as to allow engine oil to be accurately and cleanly checked without necessitating the use of a rag or similar wiper.

The invention is especially suitable for use in connection with a vehicle engine and enables checking the oil levels in an engine with a one hand operation and without the need for any extraneous wiper which may be unavailable, the use of which is a dirty operation and the disposal of which may create environmental litter.

Checking of oil levels at regular intervals is recommended by the manufacturers of motor vehicles and often times is required in order to diagnose improper engine operation. The process of checking oil levels is both an inconvenience and a dirty operation. An oil rag or other sheet of wiper material must be found. The rag is held in one hand and used to clean the dipstick which is held in the other hand. A one handed operation is virtually impossible. Dirty oil adheres to the rag and is transferred to the hand holding the rag, unless extreme caution is taken. The rag must be disposed of properly or environmental damage and litter occur.

It is a principal object of the present invention to provide improved wiper apparatus which allows oil levels to be accurately and cleanly checked without necessitating the use of any rags or similar wiper.

It is a further object of the present invention to provide improved apparatus for wiping oil from a dipstick to enable the checking of oil with a one hand operation.

It is a still further object of the present invention to provide wiper apparatus for wiping oil from a dipstick which is simple and rugged, containing no moving parts.

It is a still further object of the present invention to provide improved wiper apparatus for wiping oil from the dipstick which can be mounted directly on the tube in which the dipstick is removably disposed.

It is a still further object of the present invention to provide improved wiper apparatus for wiping oil from a dipstick in which the wiper material may easily be cleaned or replaced.

It is a still further object of the present invention to provide improved wiper apparatus for wiping oil from a dipstick which may be mounted on an engine in the engine compartment without interfering with any of the operational parts of the engine.

It is a still further object of the invention to provide improved apparatus for wiping oil from a dipstick which will decrease the incidence of careless disposal of an oily rag or similar wiper.

It is a still further object of the present invention to provide improved wiper apparatus for wiping oil from a dipstick which enables the checking of oil level in the ordinary and conventional way, no retraining of the oil checking procedure being required.

It will be understood that the invention may be used for checking oil level in various parts of the engine and is adaptable to automatic transmission dipsticks and power steering pump dipsticks.

Briefly described, wiper apparatus for wiping oil from a dipstick which is removably disposed in a dipstick tube and which is provided in accordance with the invention has a housing which may be attached to the dipstick tube. A body of wiper material, having a slit therein for removably receiving the dipstick, is contained in the housing. Means are also provided for releasably holding the body in the housing so that it may be removed for cleaning or replacement when it becomes dirty.

The foregoing and other features, objects and advantages of the invention, as well as presently preferred embodiments thereof, will become more apparent from a reading of the following description in connection with the accompanying drawings in which:

FIG. 1 is a perspective view of the dipstick wiper apparatus mounted on a dipstick tube containing a dipstick which is provided in accordance with an embodiment of the invention;

FIG. 2 is a fragmentary sectional view of the apparatus shown in FIG. 1 taken along the plane containing the line to 2—2;

FIG. 3 is a perspective view of dipstick wiper apparatus in accordance with another embodiment of the invention showing the dipstick in wiping relationship with the apparatus;

Figure 4:
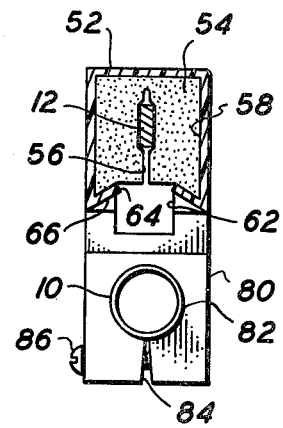
FIG. 4 is a sectional view along a plane through the line 4—4 in FIG. 3.

Referring to FIG. 1, there is shown a dipstick tube 10 which is also known as a dipstick surround tube or diptube. This tube is attached to the engine and contains a dipstick 12 which is removably mounted therein. When the oil level is to be checked, the dipstick 12 is removed from the tube 10 and must first be cleaned before being reinserted into the tube to a depth determined by a collar 14 thereon. The oil clings to the cleaned end of the dipstick and the level of oil may be read from graduations on the dipstick. This is the ordinary and conventional procedure for measuring oil levels.

In order to clean the dipstick 12, wiper apparatus 16 is provided. This apparatus comprises a housing having a generally rectilinear main portion 18 and a foot portion 20. The material of which the housing portions 18 and 20 may be made may be metal or plastic. Plastic is preferred for the main portion 18, while the foot portion 20 may preferrably be made of metal. An opening 22 extends through the main portion 18 from an upper end outer surface 24 to a lower end outer surface 26 of the main portion 18. It is preferable that this opening 22 be a longitudinal opening between the ends of the main portion 18, as shown; that is, both outer end surfaces 24 and 26 have openings which communicate with the longitudinal opening in the body. The opening in the lower end surface 26 may be smaller in width or length than the lateral cross section of the opening 22; thereby to provide a step to locate a body 28 of wiper material longitudinally in the main housing portion 18. Another slot 30 in the front facing side wall 32 of the housing portion 18 also extends into the opening 22 and through the upper end 24.

The body 22 of wiper material has a longitudinal slit 34 therein which extends to the front side of the body. The body is generally rectangular and is contained in a cartridge 36. The cartridge may be of metal or plastic. The cartridge is inserted into the top end 24 and is held behind the front wall 32. The cartridge is seated on the step above an opening 27 in the bottom end 26 of the housing portion 18. The cartridge 36, with the body of wiper material 22 therein, is held frictionally within the opening. Integral point pins may be formed in the cartridge wall to assist in the frictional connection. When the wiper material of the body 22 becomes sufficiently dirty with oil, as will be visible through the opening 30, the cartridge may be removed for cleaning or replacement for example by inserting a screwdriver through the slot 30 near the bottom thereof and pivoting the screwdriver to force the cartridge out of the top end 24 of the housing portion 18.

The wiper material is preferably foam, such as a urethane foam. Rubber, felt or other material having good wiping and absorption characteristics may be used. The dipstick 12 is, of course, inserted through the longitudinal slit 34, for example as shown in FIG. 3, and then removed by an upward and/or downward stroke as shown by the arrows.

The foot portion 20 of the housing is attached to the diptube 10 by a clamp arrangement. The clamp is formed by a hole 40 and a slot 42. The clamp is opened and closed by a screw 44.

The foot portion has another hole 46 parallel to the hole 40. This may be a rectangular hole. Yieldable legs 46 and 48 on the bottom of the main housing portion 18 extends through the hole 46 and provide a snap fit connection of the main portion 18 to the foot portion 20. (See FIG. 2).

The wiper apparatus 50 shown in FIG. 3 provides for the use of a single piece housing 52, and a body 54 of wiper material which may be self-contained, that is, a generally rectangular piece of material such as felt, foam, rubber or the like, having a longitudinal slit 56 therein.

The housing 50 has a generally rectangular opening 58. Openings in the outer end surfaces 60 and 62 enable the body of wiper material 54 to be inserted into the housing 52. A step at the lower opening 63 along the rear edge thereof assists in seating the body of wiper material 54.

A slot 64 in the front side wall 66 makes the slit 56 in the body of wiper material 54 visible so that the amount of dirt or oil collected thereon may be observed. The front wall 66 may be inwardly inclined so as to enable the body of wiper material to be inserted through the slot 64 and held upon expansion against the inside of the front wall 66, if desired.

Figure 5:
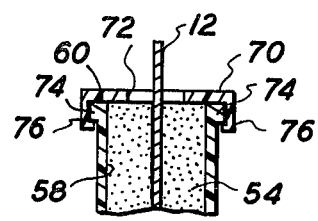
FIG. 5 is a fragmentary sectional view taken along the plane containing the line 5—5 in FIG. 3.

A cap 70 allows the body of wiper material 54 to be releasably held in the opening 58. The cap has a slot 72 so that it partially covers the body of wiper material 54. (See FIG. 5) The sides and, if desired, the back of the upper end of the housing may be formed with ridges 74 such that the sides 76 of the cap may snap over and hold the cap in place on the top of the housing to releasably retain the body of wiper material 54.

The foot 80 of the housing 52 has an opening 82 (See FIG. 4), and a slit 84. The wiper apparatus 50 is attached to the diptube 10 by inserting the diptube through the hole 82 and tightening the clamp with a screw 86.

Figure 6:
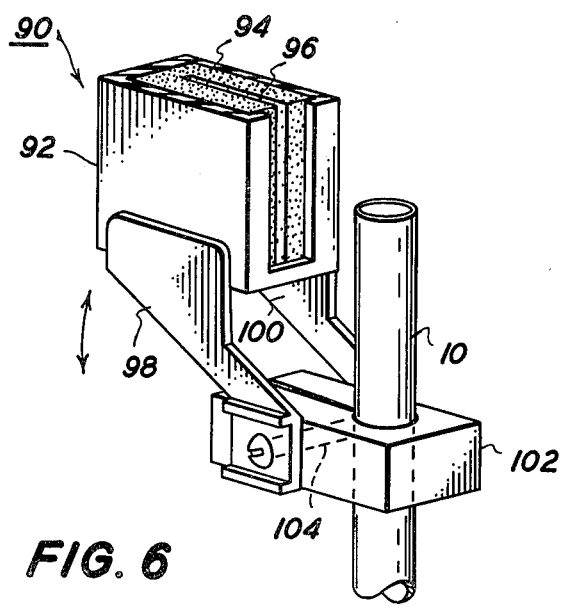
FIG. 6 is a fragmentary perspective view of dipstick wiper apparatus in accordance with still another embodiment of the invention.

Referring to FIG. 6, another embodiment 90 of the wiper apparatus is shown. The housing 92 is similar to the main housing portion 18 (FIG. 1) in that it may receive a cartridge containing body 94 of wiper material with a longitudinal slit 96, or the housing 92 may be similar to the housing 52 (FIG. 3) where the body 94 of wiper material is inserted into the opening in the housing 92. The housing 92 has legs 98 and 100 separated, approximately, by the width of the foot portion 102. The foot 102 provides a generally "U" shape clamp. The aligned holes in the foot 102 and legs 98 and 100 allow the housing be clamped to the foot 102 upon tightening a screw 97 threaded into the holes in the legs and foot. It is an important feature of this embodiment of wiper apparatus 90 that the housing 90 can be pivoted to any selected angular position to be more universally adapted for mounting in the engine or engine compartment. The foot 102 is clamped to the diptube 10 when the screw 97 is tightened. The foot may be alternatively of the design shown in FIG. 1 described above.

From the foregoing description it will be apparent that there has been provided improved dipstick wiper apparatus. While plural embodiments of this apparatus have been shown, variations and modifications within the scope of the invention will, undoubtedly suggest themselves to those skilled in the art. For example, the apparatus may be mounted upside down on the diptube 10 (in inverted position from the position shown in FIG. 1 and FIG. 3). The apparatus may mount to a convenient part of the engine or engine compartment other than the dip surround tube (for example, directly to the engine block by means of a magnet). The opening which contains the body of wiper material may be a blind opening, if only the tip at the measuring end of the dipstick is to be cleaned. The opening may extend laterally rather than longitudinally, if space is available for holding the dipstick 12 horizontally while it is being wiped. Accordingly, the foregoing description should be taken as illustrative and not in a limiting sense.

I claim:

1. Dipstick wiper apparatus comprising a housing having a generally rectilinear portion and a foot portion, said rectilinear portion having a top, a bottom and a plurality of sides, said housing being open at the top and bottom thereof and said sides defining an opening extending longitudinally between the top and bottom thereof, one of said sides having an opening therethrough the other of said sides being closed, said foot portion being disposed at said bottom, a body of wiper material also generally rectilinear and having a top, a bottom and a plurality of sides, a slit extending longitudinally through said body between its top and bottom and laterally through one side thereof, said body being disposed in said longitudinal opening with said slit exposed through the open top and bottom of said rectilinear housing portion and through said opening in one side of said rectilinear housing portion for receiving said dipstick when inserted longitudinally into said slit and presenting said body for observation to said opening in said one side, said foot portion defining a generally "L" shape with said rectilinear body portion and having means for connection of said apparatus to a dipstick tube.

2. Apparatus according to claim 1 wherein the opening through said bottom of said rectilinear housing portion is of smaller lateral cross sectional area than the opening in the top thereof, to provide a step extending laterally from at least one of the sides of said rectilinear body portion on which said body is seated when disposed in said longitudinal opening in said rectilinear body portion.

3. Apparatus according to claim 2 further comprising a cover member on the top of said rectilinear body portion and removably attached thereto, said cover member partially covering said top of said body to retain said body in said longitudinal opening in said rectilinear body portion against said step.

4. Apparatus according to claim 1 wherein said foot portion has an opening therein for receiving said dipstick tube for attachment of said housing to said tube.

5. Apparatus according to claim 4 wherein said rectilinear housing portion containing said body and said foot portion are separate, another opening in said foot portion generally parallel to said tube receiving opening therein, a snap fit connection on a surface of said housing opposite to said outer surface, said connection being disposed in said parallel opening and attaching said body containing housing portion to said foot portion.

6. Apparatus according to claim 4 wherein said housing portion containing said body has legs extending from opposite sides thereof, which are perpendicular to said one side, downwardly from said bottom thereof, means for pivotally mounting said legs on said foot portion to locate said housing portion at selected angular positions with respect to said foot portion and for clamping said legs to said foot portion at said selected angular positions.

7. The apparatus according to claim 1 wherein said one side is inclined inwardly into said longitudinal opening to facilitate insertion of said body into said rectilinear housing portion through the opening in said one side.

* * * * *